Dec. 4, 1951 M. NEWCOMER 2,577,124
BONDING UNHEXED TUBES
Filed Jan. 7, 1947 4 Sheets-Sheet 1

INVENTOR
Martin Newcomer
BY
Austin, Wilhelm & Carlson
ATTORNEYS

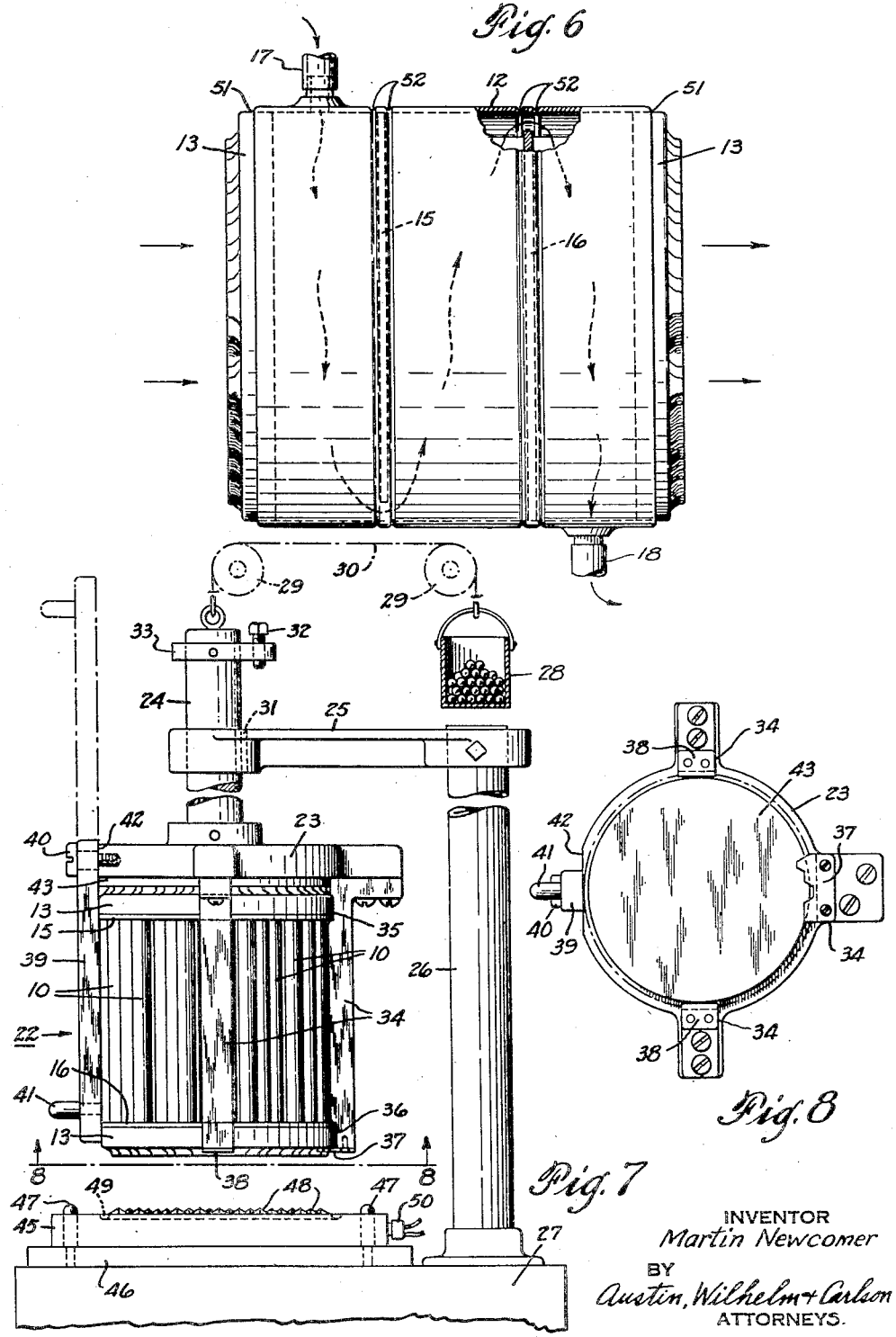

Dec. 4, 1951 M. NEWCOMER 2,577,124
BONDING UNHEXED TUBES
Filed Jan. 7, 1947 4 Sheets-Sheet 3
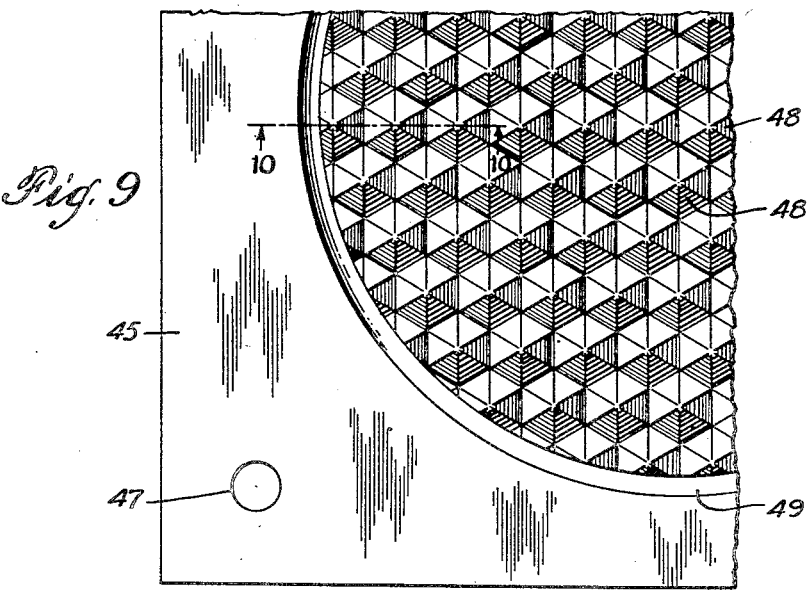
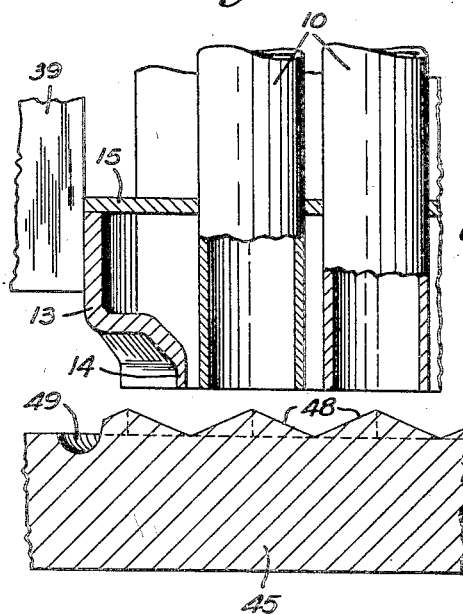
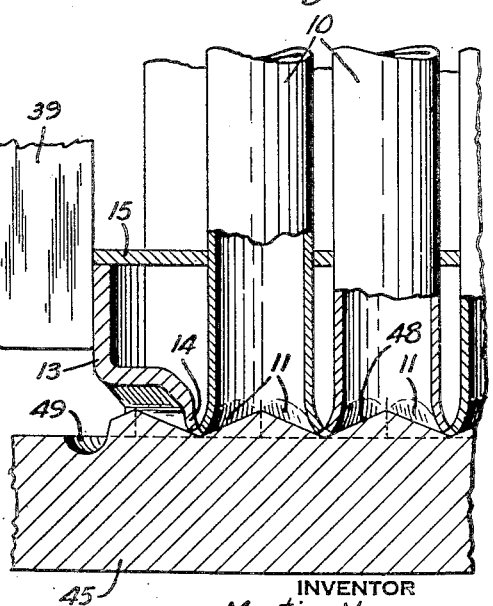
INVENTOR
Martin Newcomer
BY
Austin, Wilhelm & Carlson
ATTORNEYS.

Dec. 4, 1951 M. NEWCOMER 2,577,124
BONDING UNHEXED TUBES
Filed Jan. 7, 1947 4 Sheets-Sheet 4

INVENTOR
Martin Newcomer
BY
Austin, Wilhelm & Carlson
ATTORNEYS

Patented Dec. 4, 1951

2,577,124

UNITED STATES PATENT OFFICE 2,577,124

BONDING UNHEXED TUBES

Martin Newcomer, Cheshire, Conn., assignor to Olin Industries, Inc., New Haven, Conn., a corporation of Delaware Application January 7, 1947, Serial No. 720,647

4 Claims. (Cl. 29—157.3)

The invention relates to metal bonding and, more especially, to expanding, hexing and welding the ends of thin wall metal tubes, such as used for cartridge core heat exchangers, all in one operation.

The present invention constitutes an improvement over Hitchens and Stroke application, Serial No. 703,558, filed October 16, 1946. According to the prior application a core of cartridge type heat exchanger tubes is welded by pressing the bundle of stacked tubes edgewise against a flat welding plate. Such practice requires that the tube ends be expanded and hexed in the usual way prior to the welding operation.

The present invention constitutes an improvement in bonding the tubes of heat exchangers, according to which the tubes are not only welded together, but at the same time the tube ends are expanded and hexed so that the expanding, hexing and welding is all done virtually in one operation.

According to a preferred method of practicing the invention, a group of aluminum tubes are threaded through spacing plates laid out according to the desired tube spacing in the finished product. This bundle is placed in the holder or jig provided with suitable registering devices so that the bundle may be pressed against the welding plate, such plate being provided with pyramidal studs exactly centered with respect to the individual tubes. The tube bundle may be suitably cleaned and pre-heated before the welding operation. After the welding plate is brought to proper temperature and a layer of flux has been applied, the holder containing the tube bundle is brought down against the welding plate. The pyramidal studs entering the tubes expand and hex them as the end portions of the tube soften and melt, the molten aluminum coalescing and bonding the tube ends together forming in effect a cast header. If desired, the spacing plates may, after welding, be shifted axially of the tubes to form barriers in the finished heat exchanger.

Instead of utilizing spacing plates, according to the invention a pin plate may be provided for holding the tubes in proper relationship during the welding operation. The pin plate may comprise a flat plate having a plurality of pins having bifurcated ends, the several tubes fitting over these pins and held in position by their bifurcated ends. This method lends itself to the simultaneous bonding of longitudinally extending barriers, which barriers may be fitted in between the desired rows of tubes so that when the tubes bear down against the studded welding plate, the welding operation welds the edge of the barrier into a unitary structure with the tube ends which form the cast header.

The invention also consists in certain new and original features and combinations hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which Fig. 1 is an end view of a heat exchanger, made in accordance with the teachings of this invention, partially assembled preparatory to the welding operation;

Fig. 6 is a side elevation, in completed form, of one form of heat exchanger which may be made by practicing the present invention;

Fig. 7 illustrates diagrammatically one form of apparatus for practicing the invention;

Fig. 8 is a bottom plan view of the work holder taken on the line 8—8 of Fig. 7, the work being omitted for purposes of illustration;

Fig. 9 is a plan view of the studded welding plate used in practicing the invention;

Fig. 10 is a fragmentary section taken on the line 10—10 of Fig. 9, illustrating the position of the tube bundle just prior to the welding operation;

Fig. 11 is a view corresponding to Fig. 10 but illustrating the position of the tube bundle during welding;

Figure 1:
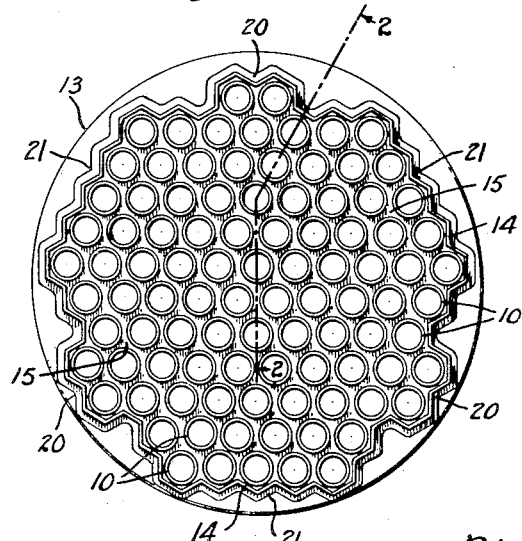

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring to the drawings and more particularly to Figs. 3 to 6, the heat exchanger according to a preferred method of practicing the invention will first be described. Here the wrought aluminum tubes, which may be either drawn or extruded by processes well known in the art and consisting of commercially pure aluminum or alloys predominantly of aluminum, have bodies 10 and enlarged hexed ends 11 welded together. The hexed ends space the bodies 10 apart to provide space between the tubes for the flow of one of the fluids between which heat is exchanged, usually liquid. The other fluid, usually air, passes lengthwise through the interior of the tubes.

Surrounding the core of tubes are annular end caps or collars 13 having thinned edges 14 shaped to the peculiar configuration shown particularly in Fig. 1. This configuration has regularly recurring, irregular peripheral segments 20 and 21 resulting from the stacking of the hexagonal ended tubes. Such irregular outline permits the use of all regular tubes and does not require special tube shapes to adapt the outline of the core to the circular shape of the cap 13. The thinned edges 14 facilitate bonding with the thin tube ends. It will be understood that the material of the tubes may be of the order of .006 inch in thickness while the material of the caps 13 may be considerably heavier, of the order of one-sixteenth of an inch thickness and the scarfing or thinning of the edges of the heavier material to a thickness comparable with that of the thinner material facilitates welding.

The heat exchanger, as shown in Fig. 6, has partitions 15 and 16, an inlet connection 17 and outlet connection 18 forming a tortuous passage for the coolant. A cylindrical shell 12 surrounds the caps 13 and is welded thereto as at 51 by a separate welding operation as explained hereinafter. The partitions 15, 16 divide the heat exchanger into compartments and have additional cut-away segmental portions 53 (see Fig. 5) to provide openings between the compartments.

Figure 2:
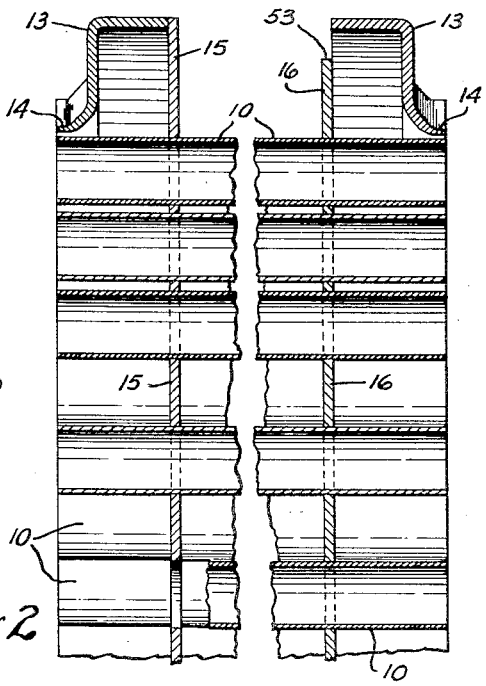
Fig. 2 is an enlarged section on the line 2—2 of Fig. 1.
Figure 3:
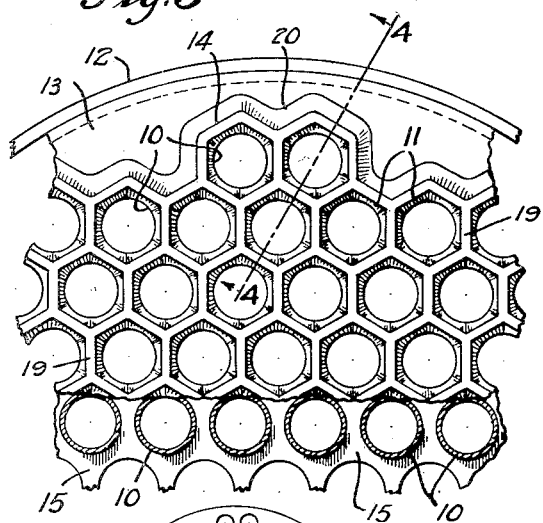
Fig. 3 is a fragmentary end view, partly in section, illustrating the completed, welded heat exchanger.
Figure 4:
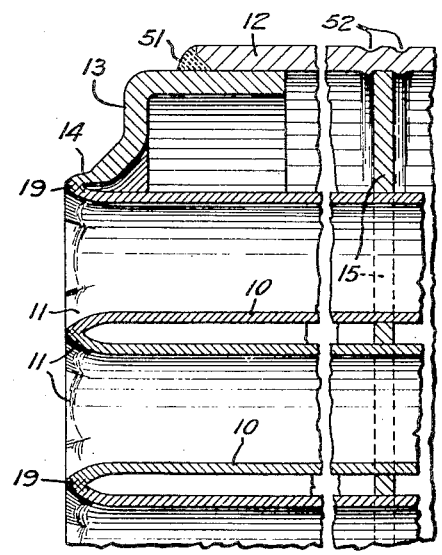
Fig. 4 is an enlarged fragmentary section on the line 4—4 of Fig. 3.
Figure 5:
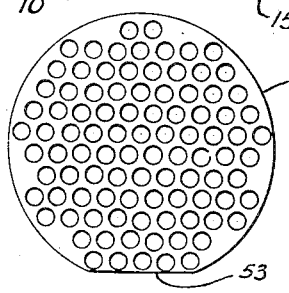
Fig. 5 is a detail of a spacing plate used in assembling the heat exchanger.

The heat exchanger is assembled for the welding operation as follows. The tubes before bonding are unhexed and are assembled as illustrated in Figs. 1 and 2. They are threaded through spacing or holding plates 15 and 16 (Fig. 5) having preformed holes, spacing the tube bodies the proper distance apart corresponding to the welding studs or pyramids 48 on the welding plate 45 as explained hereinafter. The end caps 13, having been preshaped to have the thin edges 14 and having the irregular outline discussed above, are then placed on the tube bundle as illustrated in Fig. 2.

It will be understood that the frictional fit of the several tubes with the spacing plates 15, 16 and with the end collars 13 is sufficiently tight to hold the parts in preassembled relation prior to and during the welding operation.

It will be understood that the bonding process according to the invention expands and hexes the tube ends and autogenously welds such enlarged tube ends together and to the end caps 13 producing a locally cast beaded network indicated by 19 which in effect forms a locally cast header. The two ends of the tube bundle are similarly bonded forming in effect two headers of cast aluminum integrally connected by tube bodies of wrought aluminum. The method of bonding will be described hereinafter more in detail.

Referring now to Figs. 7 and 8 there is shown diagrammatically one form of apparatus by which the invention may be practiced. This apparatus includes a counter-balancing device including a bucket of shot 28 counter-balancing the bundle of tubes held by the jig holder 22 which holder places the tube bundle in register with the pyramids 48 on the welding plate 45 for the welding operation.

The holder 22 comprises a holding plate 23 suspended by a plunger 24 vertically slidable in a stationary guide 25 supported upon a standard 26 secured to a base 27. The plunger 24 and guide 25 have a feather keyway arrangement 31 for permitting vertical movement of the holder 22 without rotary movement. A line 30 running over stationary pulleys 29 connects the plunger 24 and shot bucket 28. A set screw 32 is threaded into a collar 33 secured to the plunger 24 and engages with the guide arm 25 to limit the downward movement of the holder 22 and thereby the amount of melting of the tube ends as described below.

The shape of the holder 22 may vary according to the shape of the heat exchanger or other article being welded. As shown, it has three depending arms 34 having suitable recesses 35 and 36 to accommodate the contour of the pre-assembled tube bundle. One of the arms 34 has a register plate 37 having the outline of a peripheral section of the tube core to insure holding the tube bundle in the correct rotative position for correct register with the welding plate. The register plate 37 and auxiliary plates 38 on the other arms engage against the heat exchanger cap to hold the heat exchanger in proper position within the holder.

For convenience in placing the tube bundle in the holder 22, a retaining bar 39 is pivoted at 40 to a flat section 42 on plate 23. Bar 39 has a handle 41 by which it may be swung to the upper position shown in dot and dash lines in Fig. 7 while inserting or removing a tube bundle.

The tube ends are hexed and welded together and to the caps by pressing the tube bundle against the welding plate 45. This welding plate may be of any material which will withstand the high welding temperatures and the chemical action of the flux and metal to be welded. For flux and aluminum having compositions given below, an Inconel welding plate has given satisfactory service. Inconel is a nickel alloy manufactured by the International Nickel Company comprising approximately 80% nickel, 12–14% chromium, and 6% iron. This plate is fashioned with a plurality of relatively flat pyramidal protuberances 48 on its upper surface, each pyramid 48 being six sided and having a hexagonal base to correspond to the hexed ends of the tubes to be formed during the welding operation. The welding plate 45 also has a peripheral groove 49 for collecting any liquid flux that may not be retained by the pyramids 48. Suitable dowel arrangements, indicated by 47, holds the welding plate 45 on the top of a suitable furnace 46 and insures holding the welding plate in proper register with respect to the holder 22 and tube bundle.

The furnace 46 may be a gas fired pot furnace having its temperature controlled pyrometrically, the pyrometer correction being indicated by 50. The welding plate 45 may also be heated electrically, as by inductance or resistance means, or in a bath of molten lead.

One method of using the above apparatus to make the above heat exchanger is as follows. The bundle of tubes 10, the spacing plates 15 and 16, and the end caps 13 are first assembled as explained above to form the tube bundle as illustrated in Figs. 1 and 2. This bundle is then temporarily positioned within the holder 22 with the upper cap 13 and upper spacing plate 15 located within the recesses 35 and the lower cap 13 and lower spacing plate 16 within the lower recesses 36. Heat insulation plate 43 is interposed between holder plate 23 and the top face of the tube bundle. This pre-assembly is done for certain preliminary adjustments, as for example, obtaining proper counter-balance, proper welding weight and proper set screw seating.

After the bundle is secured in position in the holder 22, shot is added to the container 28 or removed therefrom exactly to counter-balance the system. The bundle is then placed upon the welding plate 45 in register with the pyramids 48 and the set screw 23 adjusted to the proper amount from the guide 25 to control the desired amount of tube melting.

With the system exactly counter-balanced, proper weight (not shown) is placed upon holder plate 23 to exert the desired downward pressure on the bundle to control the welding action. The optimum weight can readily be determined by experiment for the particular article to be welded. Sufficient weight must be used to properly expand and hex the tube ends.

The bundle assembly is then removed from the holder 22. The bundle is then thoroughly cleaned in any desired manner to remove all foreign matter such as aluminum oxide, dirt and scale to expose the pure metal for the welding operation.

A preferred cleaning operation includes immersing the bundle for a period of from 10 to 30 seconds in a warm 10% sodium hydroxide solution. This is followed by a rinse in pure water, after which the bundle is immersed in a warm 10% nitric acid solution for a period of from 1 to 2 minutes. The bundle is then thoroughly rinsed in warm water.

The bundle assembly is then placed in a preheating oven. Preheating the bundle to a temperature of 950° F. before welding produces good results with the aluminum base compositions given below. The preheating temperature is not especially critical except that it should be high enough to promote welding without requiring the bundle to engage the hot welding plate for too much time, and should be low enough to avoid undue oxidation of the aluminum. A ten minute preheating period has been found to be satisfactory but this again will depend upon the size and conditions.

In the meantime, the welding plate or block 45 is heated to proper temperature, scraped clean, and the welding flux powder (specified below) is added to the surface thereof. Generally, a slight excess of flux is added to insure forming a molten layer about $\frac{3}{32}$ inch deep over the surface of block 45, the surplus overflowing at the edges into groove 49.

The bundle assembly is remounted in holder 22 with the heat insulation plate 43 interposed and the apparatus is ready for the welding operation. The bundle is placed in contact with the welding plate 45, the registering provisions locating the tube centers in exact register with the apices of the pyramids 48; the welding weight is added to the otherwise counter-balanced system to feed the bundle downwardly, as the tube ends melt, until the adjustable stop screw 32 engages guide 25.

The time of welding is the time required for the limit stop 32 to travel its full displacement to position against guide 25. This is dependent upon several variables and has been found to vary from 3½ to 120 seconds. A displacement of ⅛ of an inch has been found to give satisfactory results. This means that the tube ends melt a distance of approximately $\frac{1}{16}$ of an inch, while the wedge-like action of the pyramids 48 expands the softened or plastic tube ends, hexing them and causing the tube ends to flow into the hexagonal shaped valleys between the pyramids where they melt and bond together to form the beaded network comprising the cast header 19.

The powder flux melts in a thin layer covering the surface of the welding plate including the pyramids. The molten flux wets the tube ends, and aluminum deformation and melting follows shortly thereafter, this action being accomplished both by heat from the flux and by heat from the welding plate. The softened tube ends expand to hex shape and the molten aluminum flows in the hexagonal valleys between the pyramids 48 to weld the tube ends to each other and to the end cap 13, forming a local casting extending homogeneously throughout the entire end face of the bundle and forming in effect a cast header.

As soon as the limit stop 32 engages guide 25, the welding operation is completed. The bundle is removed from the holder 22 and the welding plate is scraped to remove all surface flux. The position of the bundle is then reversed in the holder 22 and the welding operation is repeated by engaging the other ends of the tubes against the welding block and using the welding weight and limit stops in the same manner as described for welding the first end face. After welding the second end face, the bundle is thoroughly washed to remove all flux.

Before each welding operation, it is necessary to scrape residual, partly decomposed flux from the surface of the welding block, and add fresh flux. This tends to promote rapid wetting and heating of the metal parts to be welded and is an important factor in providing reproducible results.

The invention may be applied to the welding of parts made of the same metal, for example, of copper, brass, magnesium, or zinc, but it is particularly applicable to welding parts of aluminum or aluminum alloys, with respect to which the following specific examples as to composition and temperatures are given.

Articles of aluminum or aluminum alloys have been successfully welded by the described process at welding block temperatures ranging from about 1400 to 1500° F., the period of the welding operation varying according to the temperature and the extent of the weld from about 3½ to 120 seconds. Excellent results are obtainable in welding commercially pure aluminum using a welding block temperature in the range of 1475 to 1500° F., the welding period extending for 15 to 30 seconds.

Excellent results were obtained using an aluminum alloy manufactured by the Aluminum Company of America and known as XJ-51-S. This alloy has a composition of 0.25% copper, 0.6% magnesium, 0.35% silicon, balance aluminum. This composition has a melting temperature range of from approximately 1140 to 1210° F. Optimum welding temperature for the welding block with this alloy was found to be from 1450 to 1475° F., the welding period extending from 15 to 30 seconds.

Another aluminum alloy giving good results under test, and manufactured by the Aluminum Company of America, is known as alloy 61-S. This has a composition of 0.25% chromium, 0.25% copper, 1.0% magnesium, 0.6% silicon, balance being aluminum. This composition has a melting temperature range of from 1115 to 1210° F. Optimum welding temperature for the welding block with this alloy was found to be between 1425 to 1450° F., the welding period extending from 15 to 30 seconds.

A suitable flux for use in welding the above compositions was found to be a flux manufactured by the Aluminum Company of America, known as Alcoa Brazing Flux No. 53. This was found to have an approximate composition of 34.7% potassium chloride, 49.0% sodium chloride, 8.2% cryolite, 1.0% strontium chloride, 1.0% sodium fluoride, 6.1% moisture, and a trace of lithium by spectroscopic analysis.

After the welding of the end caps and the tube ends together, the spacing plates 15 and 16 are slid lengthwise of the tubes to positions somewhat as indicated in Fig. 6 to form baffles in the completed heat exchanger. The tubular shell 12 is then placed around the assembled bundle and welded by a separate operation to the end caps 13, the welding being indicated by 51 in Fig. 4. If desired, the shell 12 may have annular grooves 52 fashioned therein seating the baffle plates 15 and 16 to prevent longitudinal movement thereof in use.

It will be noted that the plates 15 and 16 have chordal portions (see 53 in Fig. 5) providing connecting passages from one side to the other, to obtain the tortuous fluid flow as indicated in Fig. 6. The inlet and outlet connections 17 and 18 will be secured to the shell 12 in the usual manner.

Thus a heat exchanger and a method of bonding are provided which have many advantages. The shell and core of aluminum tubes are firmly and securely bonded, forming an integral unit, wherein the cast headers formed by the autogenous welding of the two ends are integrally connected by wrought tube bodies. The disadvantages of bonding by aluminum brazing alloy are avoided. The heat exchanger of this invention is far stronger, and can operate without failure under higher pressures, than heat exchangers made by brazing or soldering methods.

Test sections through the tube ends of completed heat exchangers, and photomicrographs of said sections, indicate a cast metal structure in the welded ends having relatively much larger grains than the wrought metal in the body of the tubes. The beaded network formed by the autogenous welding adds body to the headers without materially interfering with the fluid flow through the inside of the tubes. The force applied to the core, pressing it against the relatively flat side surfaces of the pyramids of the welding plate, helps to control the flow of the melting aluminum, tending to prevent the formation of pinholes when the molten metal solidifies. The beaded network which bonds the plates together is formed from the metal of the tubes and shell and does not require the addition of special welding metal. The process does not trap flux within the walls and does not burn the metal. The use of the shell of the same composition as that of the tubes prevents electrolytic corrosion when the heat exchanger is in use. The aluminum heat exchanger being lighter, and the absence of any catalytic action, makes it superior to the conventional copper heat exchanger for use in places where these factors are significant, such as in airplane oil coolers.

Referring now to Figs. 12 to 15, a somewhat different type of heat exchanger is illustrated which is welded by a somewhat different type of welding jig.

Figure 12:
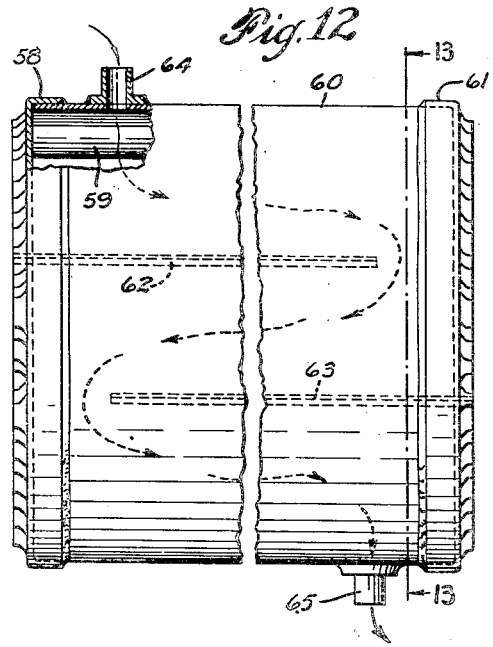
Fig. 12 is a side elevation, partly in section, illustrating another form of heat exchanger according to the invention.
Figure 13:
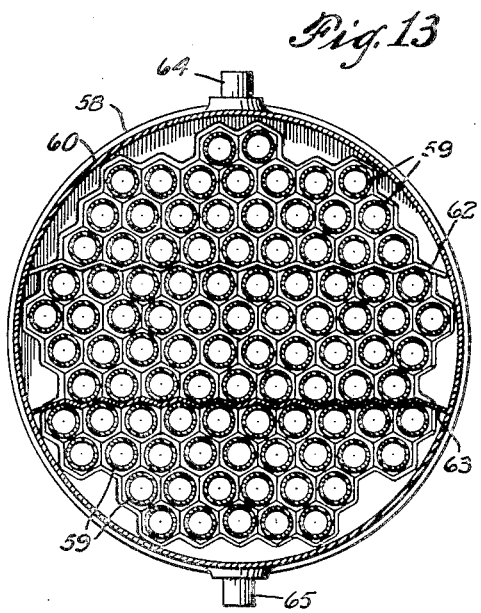
Fig. 13 is a section taken on the line 13—13 of Fig. 12.

In Figs. 12 and 13 the tube bodies 59 are expanded and welded by a welding operation using a pyramided welding plate as described above. In this form the shell 60 may be located inside of the end caps 58, 61 (which may be similar to end caps 13) and longitudinal partitions or baffles 62, 63 are provided instead of transverse baffles. Suitable inlet and outlet connections 64, 65 are provided for leading cooling fluid in the direction of the arrows shown in Fig. 12.

Before explaining the manner of assembling and welding the heat exchanger of Figs. 12 and 13, the modified welding apparatus will be explained. Here the apparatus includes a plate 68 having a series of pins 69, there being one pin for each tube of the completed heat exchanger. The pins are suitably riveted in the plate and have expandible bifurcated ends 70. These pins 69 are centered to correspond to the apices of the pyramids 48 of welding plate 45.

The pin plate 68 is adapted to be held in a holder 71 which may have a construction similar to holder 22. Holder 71 has depending arms 34', some of which have auxiliary plates 38' corresponding to plates 38 in Fig. 7. One of the arms 34 also has a register plate (not shown) corresponding to register plate 37 in Figs. 7 and 8 to insure proper registration of tubes in the holder 71 and therefore proper registration with the pyramids of the welding plate.

Figure 15:
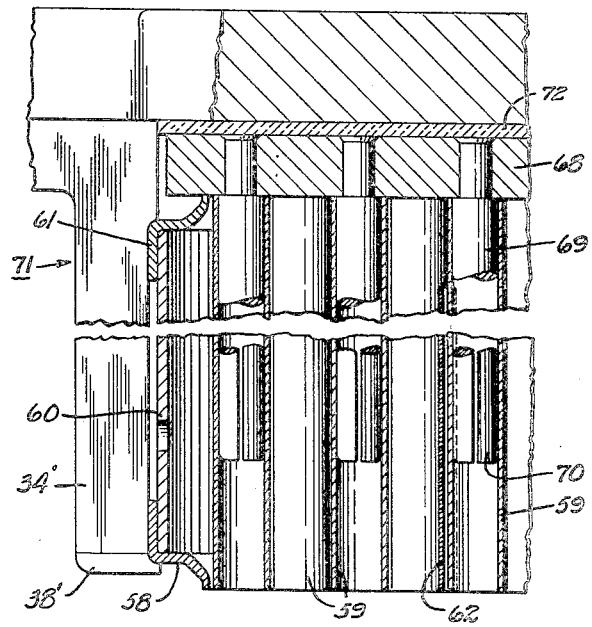
Fig. 15 illustrates diagrammatically a method of welding utilizing the pin plate of Fig. 14.
Figure 14:
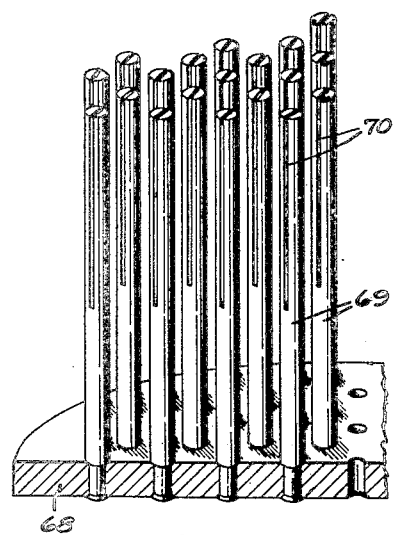
Fig. 14 is a perspective of a pin plate for holding the tubes in assembled relation, used in making the modified heat exchanger shown in Figs. 12 and 13.

The method of utilizing the apparatus of Figs. 14 and 15 will follow in general the method of welding utilizing the apparatus shown by Figs. 7 and 8, the only difference being the manner of holding the bundle in pre-assembled relation and mounting such bundle in the holder.

To pre-assemble the heat exchanger prior to welding, the several tubes 59 are first threaded on the pins 69, the bifurcated ends 70 frictionally holding the tubes in position. The first end cap 61 is then placed in position against pin plate 68, after which the shell 60 is placed within the end cap. The other end cap 58 is placed in position and the first baffle 62 is positioned between the tubes as indicated in Fig. 15. This baffle will be suitably pre-corrugated to fit snugly frictionally between the tubes of two adjoining rows as illustrated in Fig. 13.

After mounting this assembly in the holder 71 (with heat insulation plate 72 in place), the arrangement will have appearance somewhat as indicated in Fig. 15. The holder is then fed downwardly to press the bundle against the welding plate to expand the tube ends and weld them to each other and to the end cap as in the first welding method. During this welding operation the lower edge of the baffle 62 will also melt and become welded to the adjoining tube ends forming the cast header.

After welding the first header the bundle is removed from the holder 71 and the pin plate 68 removed from the bundle and the pins inserted in the bundle from the other end. The remaining baffle 63 is placed in position between its adjoining tube rows and the other end of the tube bundle is welded with the other baffle to form the other header in the same manner as described for the first end.

The invention has important advantages. It eliminates the separate expanding and hexing operation heretofore necessary prior to bonding cartridge type heat exchangers either by old fashioned soldering or brazing methods or by the newer welding method. It thus eliminates the waste due to scrap resulting from split, and otherwise defective, tubes formed by conventional hexing and expanding methods. By the use of the present invention the tube expanding, tube hexing and welding is all done in a single operation. Furthermore, welding is facilitated by the action of the wedging surfaces of the valleys between the pyramidal projections acting to press the adjacent tube ends together at the same time the welding plate melts the ends. Also the dual use of the spacing plates first for spacing the tubes during welding and later as baffles or partitions, simplifies construction. The use of the pin plate facilitates heat exchanger assembly and permits the simultaneous bonding of longitudinal partitions.

It will be noted that in all cases the members to be welded are arranged, during welding, with their adjacent margins in either direct or close contact with each other, and with their adjacent (but non-contacting) edges directly abutting the welding plate. This provides more uniform heat to all parts of the welding area and facilitates the welding operation.

In the claims the term aluminum is intended to cover tubes made of commercially pure aluminum, as well as alloys predominantly aluminum.

While certain novel features of the invention have been disclosed herein, and are pointed out in the annexed claims, it will be understood that various omissions, substitutions and changes may be made by those skilled in the art without departing from the spirit of the invention.

What is claimed is:

1. In apparatus for welding tubular heat exchangers, a welding member having a generally flat and horizontal surface, said surface having rising therefrom a plurality of relatively flat pyramidal studs, said studs having hexagonal bases, the surfaces of said studs sloping from their apices to their bases, the hexagonal bases of adjoining studs fitting together to form a honeycomb of valleys between the studs, said studs being so shaped as to engage only the ends of the tubes, means for heating said welding member to welding temperature, a holder, means on said holder for holding in spaced relation an assembly of unhexed tubes, means for registering the centers of said tubes in said holder with the apices of said studs, means for moving said holder relative to said welding member to engage the tube ends against the relatively flat surfaces of said studs, whereby said studs expand, hex and melt the tube ends, causing the expanded hexed ends to bond together, and limit means to stop said relative movement of said holder and welding member after a predetermined amount of said tube ends is melted.

2. The apparatus according to claim 1 in which said tube holder comprises a spacing plate having a plurality of holes therein in which the tubes are inserted, said holes corresponding to said studs.

3. The apparatus according to claim 1 in which the tube holder comprises a plate having a plurality of pins thereon corresponding to the studs, said tubes being telescoped over said pins.

4. The method of bonding a core of unhexed aluminum tubes by utilizing a welding member having a generally horizontal welding surface provided with upstanding relatively flat studs of pyramidal configuration with hexagonal bases and corresponding to the tubes, said method comprising preheating the tubes to a temperature less than the welding temperature before engaging the ends of the tubes with the studs, heating the welding member to welding temperature, holding a bundle of said preheated tubes in spaced relation to each other and in register with said studs, covering the welding surface with flux, bringing said tube bundle and welding member together to engage only the ends of the tubes with said studs to expand the tube ends and to melt them, stopping said feeding movement of said bundle and welding member after a predetermined amount of the tube ends has been melted, and separating said tube bundle and welding member, whereby the resulting molten metal autogenously casts the ends of the tubes together.

MARTIN NEWCOMER.

REFERENCES CITED

The following references are of record in the file of this patent:

UNITED STATES PATENTS

| Number | Name | Date |
| --- | --- | --- |
| 1,046,133 | Winslow | Dec. 3, 1912 |
| 1,182,271 | Hersh | May 9, 1916 |
| 1,852,180 | McKnight | Apr. 5, 1932 |
| 2,091,307 | Catlett et al. | Aug. 31, 1937 |
| 2,178,671 | Osborn | Nov. 7, 1939 |
| 2,258,913 | Stone | Oct. 14, 1941 |
| 2,268,369 | Askin | Dec. 30, 1941 |
| 2,270,864 | Blais | Jan. 27, 1942 |
| 2,298,996 | Woods | Oct. 13, 1942 |
| 2,307,579 | Fluke | Jan. 15, 1943 |
| 2,320,700 | Kent et al. | June 1, 1943 |
| 2,331,689 | Hodge | Oct. 12, 1943 |
| 2,337,584 | Baker | Dec. 28, 1943 |
| 2,360,934 | Burch | Oct. 24, 1944 |
| 2,396,650 | Hannah | Mar. 19, 1946 |
| 2,397,400 | Barwich | Mar. 26, 1946 |
| 2,429,888 | Moore | Oct. 28, 1947 |
| 2,433,546 | Cornelius | Dec. 30, 1947 |